US012800822B2

(12) United States Patent
Shen et al.

(10) Patent No.: US 12,800,822 B2
(45) Date of Patent: Nov. 17, 2026

(54) LIGHTING UNIT FOR A VEHICLE DISPLAY AND METHOD THEREOF

(71) Applicant: Continental Automotive Technologies GmbH, Hannover (DE)

(72) Inventors: Yew Chye Leonard Shen, Singapore (SG); Junn Yaw Ong, Singapore (SG); Wen Yao Jackson Chan, Singapore (SG)

(73) Assignee: AUMOVIO Germany GmbH

( * ) Notice: Subject to any disclaimer, the term of this patent is extended or adjusted under 35 U.S.C. 154(b) by 158 days.

(21) Appl. No.: 18/717,688

(22) PCT Filed: Nov. 3, 2022

(86) PCT No.: PCT/EP2022/080609
§ 371 (c)(1),
(2) Date: Jun. 7, 2024

(87) PCT Pub. No.: WO2023/104398
PCT Pub. Date: Jun. 15, 2023

(65) Prior Publication Data

US 2025/0050734 A1 Feb. 13, 2025

(30) Foreign Application Priority Data

Dec. 9, 2021 (GB) ...................................... 2117757

(51) Int. Cl.
*F21V 8/00* (2006.01)
*B60K 35/22* (2024.01)
*B60K 35/50* (2024.01)

(52) U.S. Cl.
CPC ............ *G02B 6/0055* (2013.01); *B60K 35/22* (2024.01); *B60K 35/50* (2024.01);
(Continued)

(58) Field of Classification Search
CPC .. B60K 35/22; B60K 35/50; B60K 2360/332; B60K 2360/336; B60K 2360/338;
(Continued)

(56) References Cited

U.S. PATENT DOCUMENTS 6,473,554 B1 10/2002 Pelka et al.
2004/0213008 A1 10/2004 Bayersdorfer et al.
(Continued)

FOREIGN PATENT DOCUMENTS

DE 2942730 A1 5/1981
DE 10141601 A1 3/2003
(Continued)

OTHER PUBLICATIONS

Search Report dated Mar. 30, 2022 from corresponding GB patent application No. 2117757.1.
(Continued)

*Primary Examiner* — Keith G. Delahoussaye
(74) *Attorney, Agent, or Firm* — COZEN O'CONNOR

(57) ABSTRACT

A lighting unit for a display apparatus for use in a motor vehicle is disclosed herein. The lighting unit includes a light transmitting panel configured to transmit light rays through to a viewing side of a display apparatus; and at least one light source operable to emit light rays across a breadth of the light transmitting panel. the light transmitting panel further comprises a reflector foil sheet applied to at least two sides of the light transmitting panel with no air gaps therebetween. A vehicle display for mounting within an interior of a motor vehicle comprising such a lighting unit, and a method of optimizing light rays for illuminating a display apparatus for use in a motor vehicle is also disclosed.

14 Claims, 6 Drawing Sheets

(52) U.S. Cl.
CPC .. *B60K 2360/332* (2024.01); *B60K 2360/336* (2024.01); *B60K 2360/338* (2024.01); *B60K 2360/343* (2024.01)

(58) Field of Classification Search
CPC ...... B60K 2360/343; B60K 2360/1523; B60K 2360/816; B60Q 3/60; B60Q 3/72; G02B 6/0055
See application file for complete search history.

(56) References Cited

U.S. PATENT DOCUMENTS

| | | | | |
|---|---|---|---|---|
| 2005/0128753 | A1* | 6/2005 | Kuo | G02B 6/0031 362/346 |
| 2017/0045676 | A1* | 2/2017 | Zhou | G02B 6/005 |
| 2017/0139120 | A1* | 5/2017 | Zeng | G02B 6/0053 |
| 2017/0276861 | A1 | 9/2017 | Watanabe et al. | |
| 2017/0368989 | A1 | 12/2017 | Kang | |
| 2019/0146145 | A1* | 5/2019 | Gu | G02B 6/0088 362/607 |
| 2020/0319393 | A1 | 10/2020 | Choi et al. | |
| 2020/0363681 | A1* | 11/2020 | Whitehead | G02F 1/133528 |
| 2021/0033771 | A1 | 2/2021 | Morabito et al. | |

FOREIGN PATENT DOCUMENTS

| | | | |
|---|---|---|---|
| DE | 102009002189 | A1 | 10/2010 |
| GB | 2405265 | A | 2/2005 |
| GB | 2598789 | A | 3/2022 |
| WO | 2017095694 | A1 | 6/2017 |

OTHER PUBLICATIONS

International Search Report and Written Opinion dated Feb. 10, 2023 from corresponding International patent application No. PCT/EP2022/080609.

Office Action of corresponding European Patent Application No. EP 22 813 220.5-1001, dated, Jun. 17, 2025.

* cited by examiner

LIGHTING UNIT FOR A VEHICLE DISPLAY AND METHOD THEREOF

CROSS REFERENCE TO RELATED APPLICATIONS

This US patent application claims the benefit of PCT patent application No. PCT/EP2022/080609, filed Nov. 3, 2022, which claims the benefit of GB patent application No. 2117757.1, filed Dec. 9, 2021, both of which are hereby incorporated by reference.

TECHNICAL FIELD

This disclosure relates to a lighting unit, in particular a lighting unit for a display for use in a motor vehicle.

BACKGROUND

Increasingly, automotive industry is adapting use of display units within motor vehicles, for both information and entertainment purposes.

In conventional display technologies, a backlight unit is necessary to provide illumination through to a viewing side of a display apparatus such that a viewer can see images that are displayed on the display apparatus. However, unlike conventional display apparatus s such as computers or television sets which usually operates indoors under controlled lighting conditions, application of vehicle displays is subject to changes in environmental lighting such has sunlight, which causes thermal issues and/or adjustment of poor ambient lighting in the evenings, which requires better contrast such that visibility of information can be clearly read by a driver.

There is therefore a need to provide a backlight unit or lighting unit which ameliorates some of the problems of vehicle displays described above.

SUMMARY

A purpose of this disclosure is to ameliorate the problem of loss of light rays within a lighting unit, in particular a lighting unit for a display for use in motor vehicles, by providing the subject-matter of the independent claims.

Further, a purpose of this disclosure is to ameliorate the problem of deterioration of backlight unit or lighting unit capabilities for vehicle displays caused by ambient lighting, by providing the subject-matter of the independent claims.

The objective of this disclosure is solved by a lighting unit for a display apparatus for use in a motor vehicle, the lighting unit comprising a light transmitting panel configured to transmit light rays through to a viewing side of a display apparatus, and at least one light source operable to emit light rays across a breadth of the light transmitting panel, wherein the light transmitting panel further comprises a reflector foil sheet applied to at least two sides of the light transmitting panel with no air gaps therebetween.

The above-described aspect of this disclosure yields a lighting unit which is operable to conserve and reflect light rays from opposing end of light sources back to any display apparatus, in particular vehicular displays, thereby increasing illumination. Since a single sheet of reflector foil is applied to at least two sides of a light transmitting panel with no gap therebetween, the above-described aspect of this disclosure is applicable to lighting unit for both flat and curved displays.

In an embodiment of a lighting unit for a display apparatus for use in a motor vehicle as described above, each of the at least two sides of the light transmitting panel comprises a breadth of the light transmitting unit.

The above aspect of this disclosure is to provide a reflective surface on the sides to the light transmitting panel, to conserve loss of light rays and/or recycle the amount of light rays created within the lighting unit.

In an embodiment of a lighting unt for a display apparatus for use in a motor vehicle as described above, the reflector foil sheet is further applied to a light directing side of the light transmitting panel.

The above aspect of this disclosure is to provide a reflective surface, i.e., a light directing side of a light transmitting panel to increase the amount of light rays being reflected within the lighting unit. This feature achieves the objective of conserving loss of light rays increasing luminance within the lighting unit.

In an embodiment of a lighting unit for a display apparatus for use in a motor vehicle as described above, the reflector foil sheet applied to the at least two sides of the light transmitting panel and the directing side of the light transmitting panel is a single sheet.

The above aspect of this disclosure is to provide a reflective surface on three sides of a light transmitting panel, to increase the amount of light rays being reflected within the lighting unit, using a single sheet of reflector foil sheet. This feature allows the reflector foil sheet to be applied to both flat and curved light transmitting panel.

In an embodiment of a lighting unit for a display apparatus for use in a motor vehicle as described above, at least one length of the light transmitting panel is partially applied with the reflector foil sheet.

The above aspect of this disclosure is to partially apply the reflector foil sheet to a length of the light transmitting panel, thus partially exposing a length of the light transmitting panel.

In an embodiment of a lighting unit for a display apparatus for use in a motor vehicle as described above, the at least one length of the light transmitting panel comprises a border portion defined by surface unapplied with the reflector foil sheet.

The above aspect of this disclosure is to partially expose the length of the light transmitting panel, to define a border portion, to allow expansion and/or contraction of the reflector foil sheet due to heat generated during operation of a display unit and/or changes to ambient temperature.

In an embodiment of a lighting unit for a display apparatus for use in a motor vehicle as described above, the border portion defined is preferably 0.08 mm, more preferably 0.09 mm and even more preferably 0.1 mm.

The above aspect of this disclosure is to provide a means of 0.08 mm to 0.1 mm to moderate the effects of expansion and/or contraction of the reflector foil sheet due to heat generated during operation of a display unit and/or changes to ambient temperature.

In an embodiment of a lighting unit for a display apparatus for use in a motor vehicle as described above, the at least one length of the light transmitting panel further comprises a buffer wall.

The above aspect of this disclosure is to provide an intermediary means to lessen or moderate the impact of expansion of the light transmitting panel due to heat sink, thereby deteriorating the performance of the lighting unit.

In an embodiment of a lighting unit for a display apparatus for use in a motor vehicle as described above, the buffer wall is made of a non-light transmitting material.

The above aspect of this disclosure is to provide an intermediary means to lessen or moderate the impact of heat sink, yet at the same time, due to the use of a non-light transmitting material, achieve the object of conserving loss of light rays and/or increasing luminance transmitting pass the light transmitting panel.

In an embodiment of a lighting unt for a display apparatus for use in a motor vehicle as described above, the non-light transmitting material is an elastic material.

The above aspect of this disclosure is to provide an intermediary means to lessen or moderate the impact of heat sink, by using an elastic material to accommodate reasonable amount of expansion and contraction cause by changes in temperature of a display system and/or ambient temperature.

In an embodiment of a lighting unit for a display apparatus for use in a motor vehicle as described above, the light transmitting panel is flat.

The above aspect of this disclosure is to provide a flat light transmitting panel having technical advantages as disclosed herein, suitable for flat displays.

In an embodiment of a lighting unit for a display apparatus for use in a motor vehicle as described above, the light transmitting panel is curved.

The above aspect of this disclosure is to provide a curved light transmitting panel having technical advantages as disclosed herein, suitable for curved display apparatus s.

The objective of this disclosure is solved by a lighting unit as defined above, suitable for mounting in a motor vehicle. The above-described aspect of this disclosure yields of an independent aftermarket lighting unit suitable for vehicular display apparatus s.

The objective of this disclosure is solved by a vehicle display apparatus comprising a lighting unit as defined above, for use in a motor vehicle. The above-described aspect of this disclosure yields of a vehicle display apparatus including a lighting unit as defined above.

The objective of this disclosure is solved by a vehicle display for mounting within an interior of a motor vehicle, the vehicle display comprising a liquid crystal display (LCD) layer, and a lighting unit as defined above, wherein at least one length of the light transmitting panel is facing an interior surface of a rooftop of a motor vehicle.

The above-described aspect of this disclosure yields a vehicle display including a lighting unit as defined above suitable for mounting within an interior of a motor vehicle, with at least one length of a light transmitting panel of the lighting unit facing an interior surface of a rooftop of the motor vehicle. An example may be a vehicular display suitable for mounting on a cockpit of a motor vehicle, with a viewing side of the vehicle display viewable from passenger or driver's seat.

In an embodiment of a vehicle display for mounting within an interior of a motor vehicle as described above, the LCD display layer is a thin-film transistor (TFT) display.

In an embodiment of a vehicle display for mounting within an interior of a motor vehicle as described above, the at least one length of the light transmitting panel further comprises a buffer wall.

The above aspect of this disclosure is to provide an intermediary means to lessen or moderate the impact of heat sink, to accommodate reasonable amount of expansion and contraction cause by changes in temperature of a display system and/or ambient temperature, yet at the same time, achieve the objective of conserving loss of light rays and/or increasing luminance of light rays.

The objective of this disclosure is solved by a method of optimizing light rays for illuminating a display apparatus for use in a motor vehicle, the method comprising transmitting light rays, by way of a light transmitting panel, through to a viewing side of a display apparatus; and emitting light rays, by way of at least one light source, across a breadth of the light transmitting panel, wherein reflecting the emitting light rays, by way of a reflected foil sheet applied to at least two sides of the light transmitting panel with no air gaps therebetween, such that the emitting light rays and reflected light rays transmit through the light transmitting panel to the viewing side of the display apparatus.

The above-described aspect of this disclosure yields a method of optimizing light rays, by conserving loss of light rays and/or increasing luminance light rays transmitting within a lighting unit by way of a reflector foil sheet applied to at least two sides of a light transmitting panel of the lighting unit, with no gaps between the light transmitting panel and the reflector foil sheet. An example may be application of the reflector foil sheet using hot stamping to achieve no gaps between the reflector foil sheet and the light transmitting panel.

BRIEF DESCRIPTION OF DRAWINGS

Other objects and aspects of this disclosure will become apparent from the following description of embodiments with reference to the accompanying drawings in which.

In various embodiments described by reference to the above figures, like reference signs refer to like components in several perspective views and/or configurations.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description. It is the intent of this disclosure to present a lighting unit for a display apparatus for use in a motor vehicle.

Figure 1:
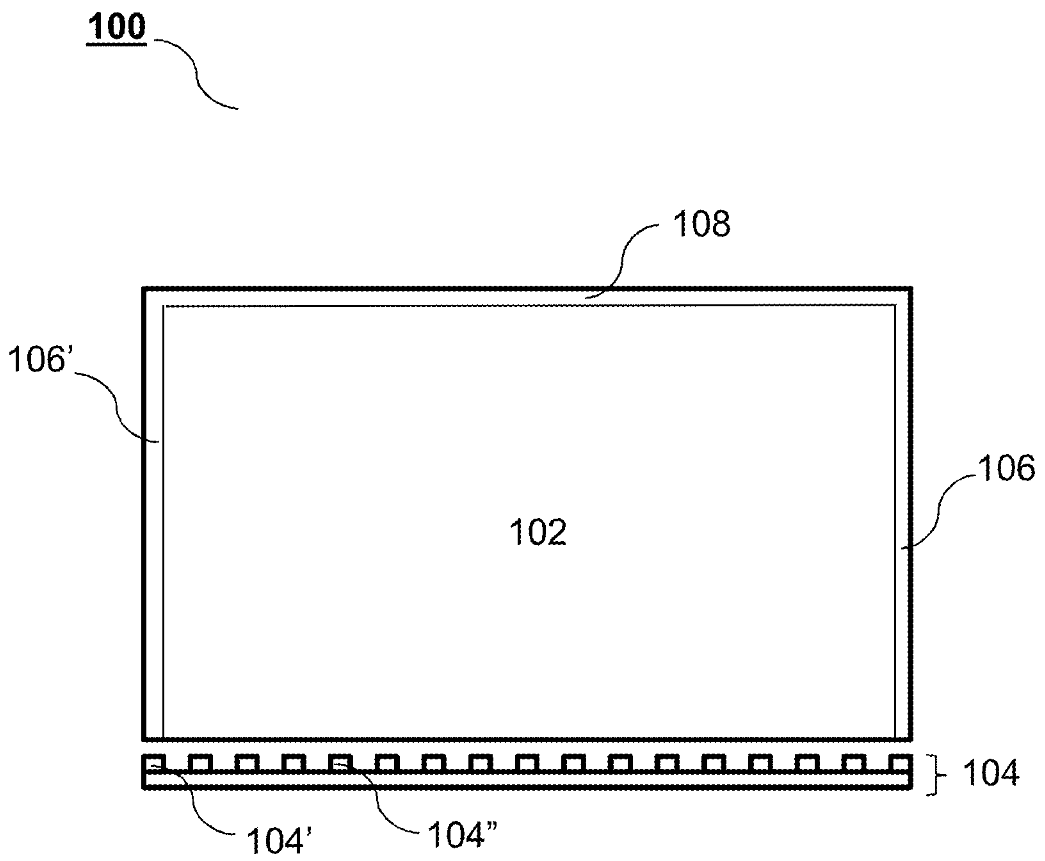
FIG. 1 shows a top view of a lighting unit in accordance with an embodiment.

FIG. 1 of the accompanying drawings shows a top view of a lighting unit 100 in accordance with an embodiment. As shown in FIG. 1, the lighting unit 100 includes a light transmitting panel 102 and at least one light source 104. In this embodiment, the at least one light source 104 is a lighting strip, for example a strip of light comprise multiple light emitting diodes (LEDs) 104', 104". The lighting unit 100 further includes at least two reflective surfaces, for example the breadth of the light transmitting pane by adhering a reflective material indicated as 106, 106'. The at least two edges of the light transmitting panel, i.e., 106, 106". In this embodiment, the at least two reflective edges are the breadth of the light transmitting panel. The light transmitting panel 102 includes a third reflective surface 108. In an embodiment, the reflective surfaces are adhered with a reflective material with no air gaps between surface of the light transmitting panel 102 and the reflective material 106, 106" and 108. In another embodiment, the reflective material is foil printed onto the light transmitting panel 102. In one embodiment, the reflective material is a reflective foil sheet. Advantageously, using a reflective foil sheet reduces the air gaps between to light transmitting panel 102 and the reflective foil sheet, and more in particular, using a single sheet of reflector foil sheet eliminates additional step of cutting the reflector foil sheet to adhere to edges of the light transmitting panel.

Figure 2:
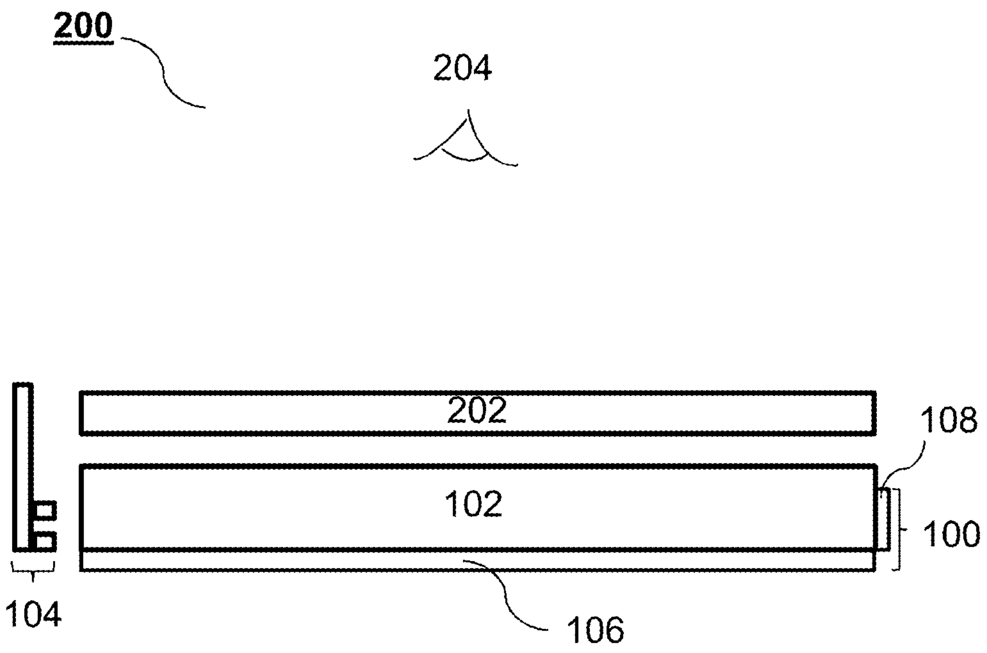
FIG. 2 shows a cross-section view of a lighting unit within a display system, in accordance with an embodiment.

Referring now to FIG. 2 which shows a cross-section view of a lighting unit 200 within a display system in accordance with an embodiment, a display layer 202 is positioned forward of the light transmitting panel 102, with at least one light source 104 positioned adjacent to the light transmitting panel 102, for transmitting light rays to light transmitting panel 102. The at least one light source 104 transmit light rays to the light transmitting panel 102. The light transmitting panel 102 includes the reflector foil sheet 106 on an edge of the light transmitting panel 102 and a reflective foil 108 partially covering another edge of the light transmitting panel 102. In the embodiment disclosed herein, the reflective foil 108 partially covers a length of the light transmitting panel 102. Light rays transmit through the display layer 202 from the lighting unit 100, to display images to a viewing side of the display, such that images displayed on the display apparatus is viewable by a viewer's eye 204. For clarity and brevity, a light transmitting side of the lighting unit 100 will be the side that transmit light towards the display layer 202, towards the viewing side of the display apparatus, visible to viewer 204. Optionally, there may be additional layers of optical elements (not shown) such as optical foils or diffusor foils between the lighting unit 100 and the display layer 202, for directing light rays towards the display layer 202. Example of suitable display layers 202 may include liquid crystal display (LCD), organic light emitting diode (OLED) display layer and thin film transistor (TFT) display layer.

Figure 3:
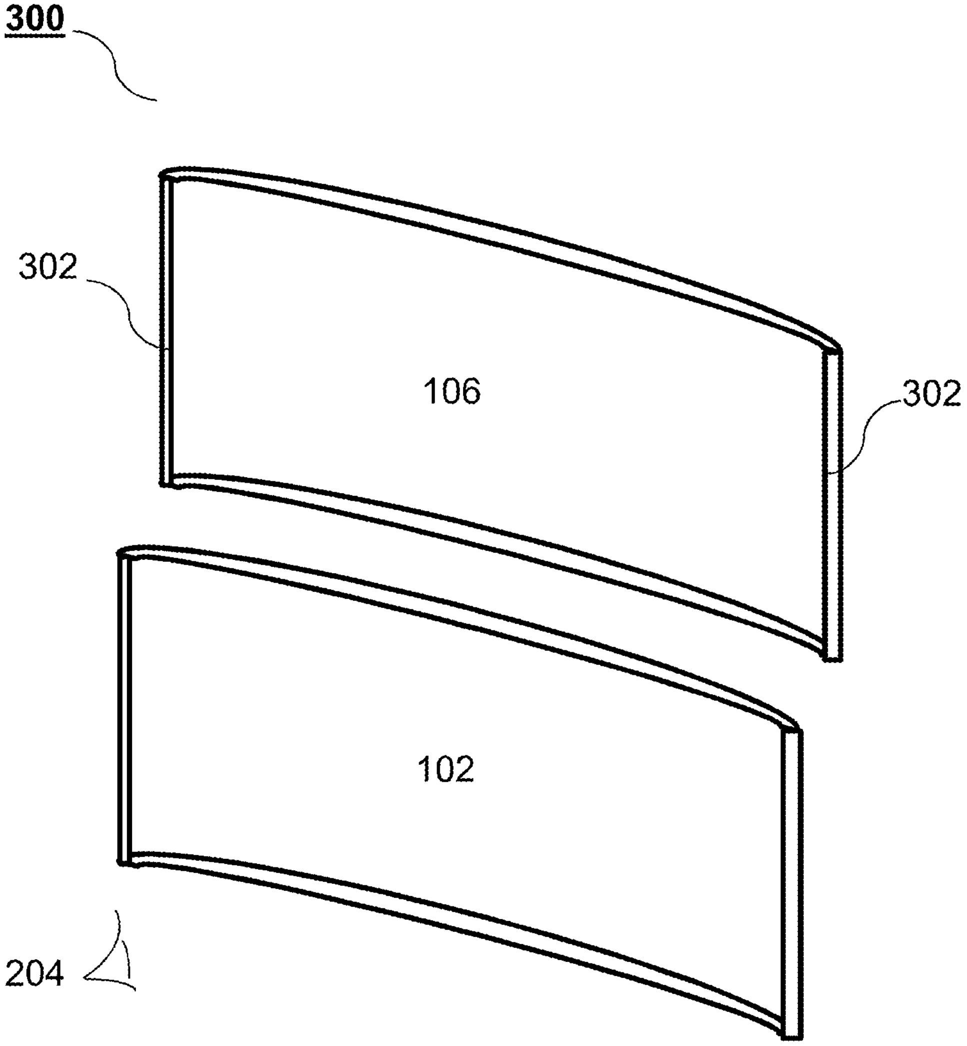
FIG. 3 shows an exploded view of a lighting unit in accordance with an embodiment.

FIG. 3 shows an exploded view of a lighting unit 300 in accordance with an embodiment. In this embodiment, the light transmitting panel 102 is curved. It shall be understood by a skilled practitioner, the same principle of this disclosure applies to a flat transmitting panel 102. In this embodiment shown in FIG. 3, a single piece of reflector foil sheet 106 is applied to the light transmitting panel 102. At least two edges or the breadth of the light transmitting panel 102 is covered with the reflective foil sheet 106. This is achieved by folding the breath of the reflector foil sheet 106 to created edges 302, 302' and adhering the reflector foil sheet 106 to the light transmitting panel 106.

Figure 4:
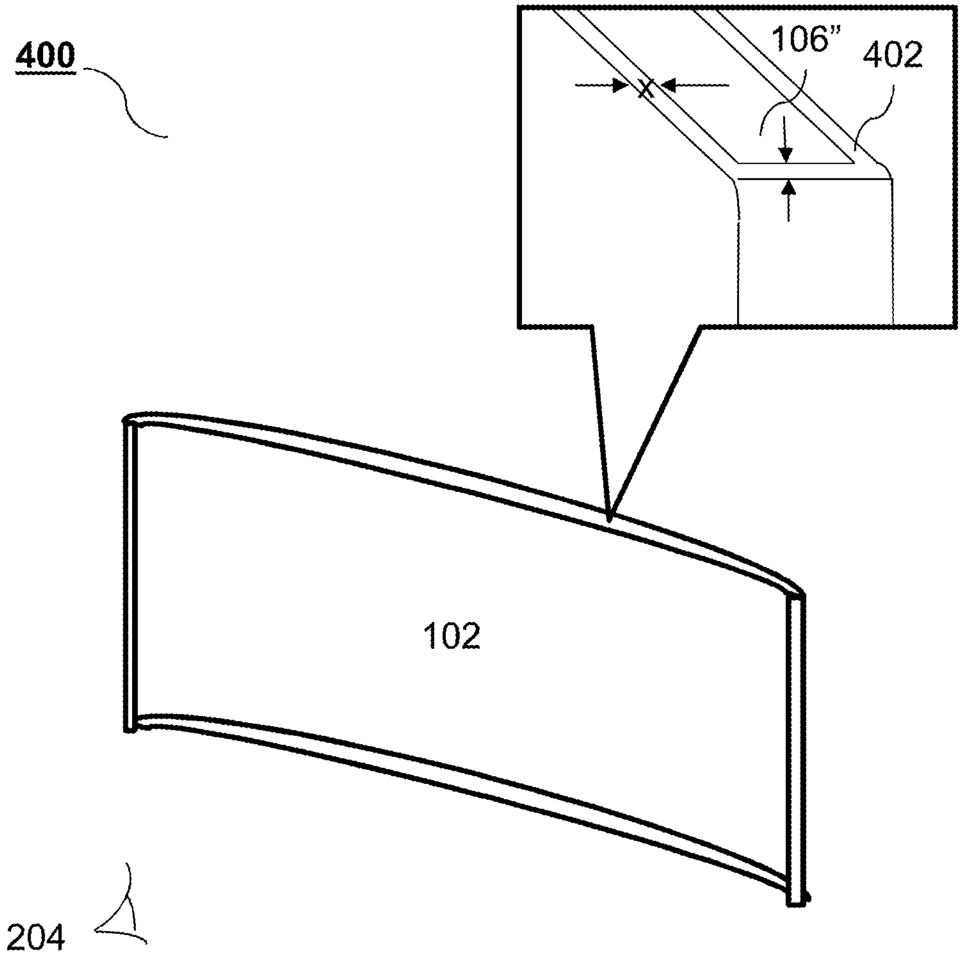
FIG. 4 shows an exploded view of a lighting unit in accordance with an embodiment.

FIG. 4 shows an exploded view of a lighting unit 400 in accordance with an embodiment. Specifically, FIG. 4 shows a zoom-in view of a part of a length of the lighting unit 100, of which at least one length of the light transmitting panel 102 is partially applied with the reflector foil sheet, thereby creating a reflective surface 108. The at least one length of the light transmitting panel 102 which is not covered by the reflective foil may be define a border portion 402. Preferably, the reflective surface 108 is applied to at least a length of the light transmitting panel 102 using printed foil technique, thus eliminating air gaps between the light transmitting panel 102 and the reflective foil sheet 106. Preferably, the border portion has a very small dimension, preferably 0.08 mm, more preferably 0.09 mm and even more preferably 0.1 mm. Advantageously, the border portion 402 provides a means to moderate expansion and contraction of the light transmitting panel 102 due to heat sink caused by the display apparatus and more in particular ambient or environmental temperature changes, e.g., sunlight or cold weather. Therefore, this embodiment is particularly advantageous to vehicle display applications.

Figure 5:
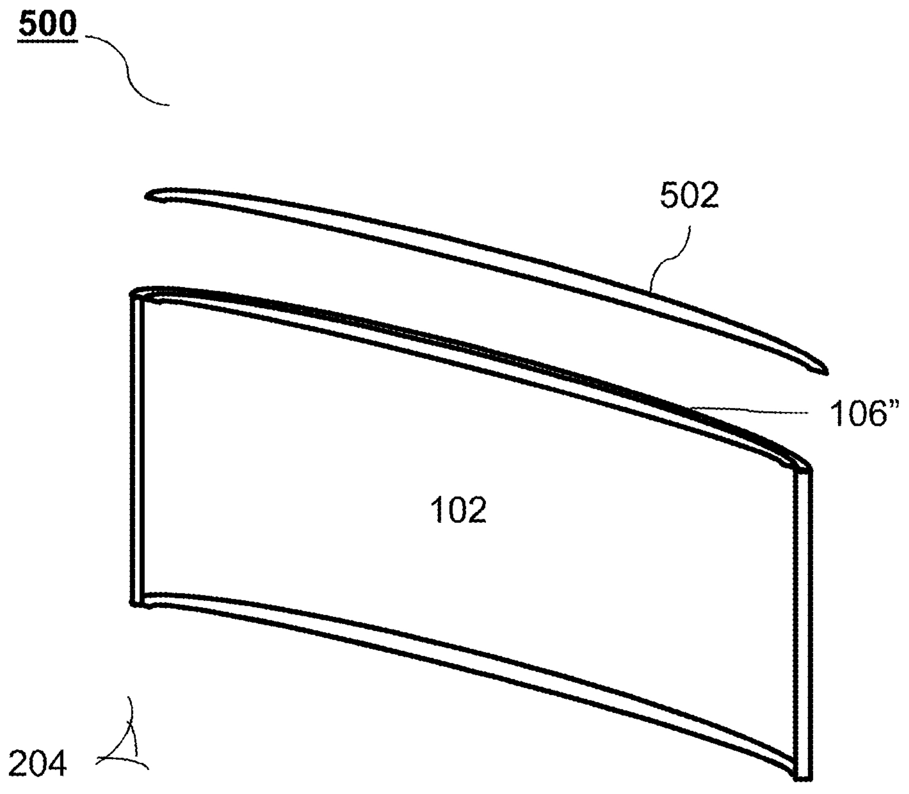
FIG. 5 shows an exploded view of a lighting unit in accordance with an embodiment.

Preferably, the at least a length of the light transmitting panel 102 with reflective surface 108 and a border portion 402 further comprises a buffer wall 502, as shown on FIG. 5, which illustrates shows an exploded view of a lighting unit 500 in accordance with an embodiment. The buffer wall 502 is ideally the same shape and size as a length of the light transmitting panel 102. The buffer wall 502 is made of non-light transmitting material. An advantage of the buffer wall 502 achieves the objective of conserving loss of light rays, which may transmit through the border portion 402. Further, the non- the non-light transmitting material is ideally an elastic material, to accommodate expansion and contraction caused by heat sink of the display apparatus and/or ambient or environmental temperature changes. An example of a suitable material may include rubber.

Figure 6:
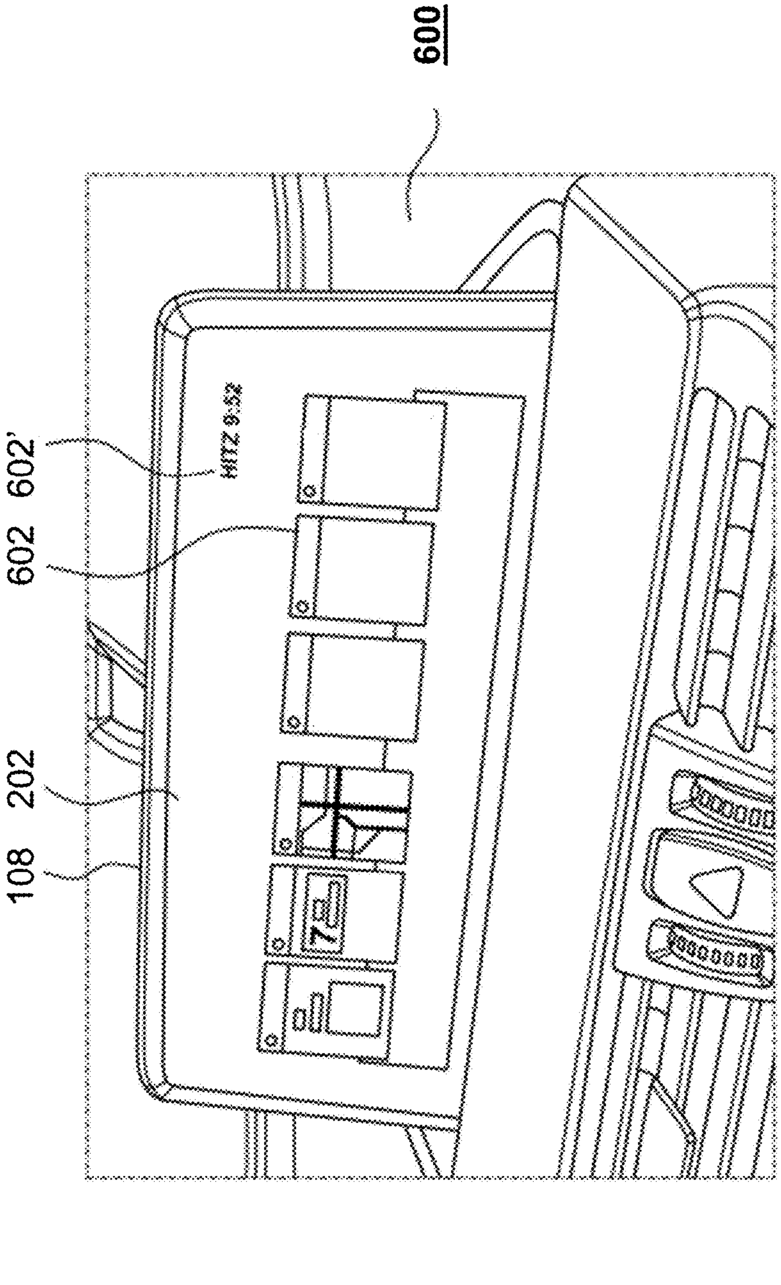
FIG. 6 shows a vehicle display in accordance with an embodiment.

Turning now to FIG. 6 which shows a vehicle display 600 in accordance with an exemplary embodiment, the vehicle display 600 is mounted on a cockpit of a motor vehicle. The display layer 202 faces an interior of a motor vehicle, such that it may be viewed by a viewer or a vehicle occupant inside the interior of a motor vehicle, with the lighting unit 100, 200, 300, 400, 500 displaced backward of the display layer 202. In this embodiment, the reflective surface 108 which at least partially covers a length of the light transmitting panel 102 faces a rooftop of an interior of a motor vehicle. When light rays are transmitted through the lighting unit 100, 200, 300, 400, 500 through to the display layer 202, images 602, 602' may be viewed by the vehicle occupant.

Thus, a lighting unit which conserves loss of light rays has been provided. Since the conservation of light rays is achieved by applying a single sheet of reflective foil sheet to a light transmitting panel, there is no additional step of cutting the reflector foil sheet to fit the light transmitting panel. Therefore, this inventive concept may be applied to both flat and curve backlight units for displays. In addition, at least one edge of the light transmitting panel is not fully covered by the reflector foil, a buffer is created to lessen or moderate the impact of expansion and contraction of the light transmitting panel, which may affect the performance of the lighting unit. While embodiments have been presented in the foregoing detailed description of the disclosure, it should be appreciated that a vast number of variation exist.

It should further be appreciated that the embodiments are only examples, and are not intended to limit the scope, applicability, operation or configuration of the disclosure in any way. Rather, the foregoing detailed description will provide those skilled in the art with a convenient road map for implementing an embodiment of the disclosure, it being understood that various changes may be made in the function and arrangement of elements and method of operation described in the embodiment without departing from the scope of the disclosure as set forth in the appended claims.

The invention claimed is:

1. A lighting unit for a display apparatus for use in a motor vehicle, the lighting unit comprising:

a light transmitting panel configured to transmit light rays through to a viewing side of the display apparatus; and at least one light source operable to emit light rays across a breadth of the light transmitting panel, wherein the light transmitting panel further comprises a reflector foil sheet that is a single sheet applied to at least two sides of the light transmitting panel with no air gaps therebetween and to a light directing side of the light transmitting panel, wherein at least one length of the light transmitting panel is partially applied with the reflector foil sheet and the at least one length of the light transmitting panel comprises a border portion defined by surface unapplied with the reflector foil sheet.

2. The lighting unit of claim 1, wherein each of the at least two sides of the light transmitting panel comprises a breadth of the light transmitting unit.

3. The lighting unit of claim 1, wherein the border portion defined is preferably 0.08 mm, more preferably 0.09 mm and even more preferably 0.1 mm.

4. The lighting unit of claim 3, wherein the at least one length of the light transmitting panel further comprises a buffer wall.

5. The lighting unit of claim 4, wherein the buffer wall is made of a non- light transmitting material.

6. The lighting unit of claim 5, wherein the non-light transmitting material is an elastic material.

7. The lighting unit according to claim 1, wherein the light transmitting panel is flat.

8. The lighting unit according to claim 1, wherein the light transmitting panel is curved.

9. A lighting unit according to claim 1, wherein the lighting unit is mounted in a motor vehicle.

10. A lighting unit according to claim 1, wherein the lighting unit is configured within a vehicle display apparatus.

11. A vehicle display for mounting within an interior of a motor vehicle, the vehicle display comprising:

a liquid crystal display (LCD) layer; and a lighting unit comprising a light transmitting panel configured to transmit light rays through to a viewing side of a display apparatus, and at least one light source operable to emit light rays across a breadth of the light transmitting panel, wherein the light transmitting panel further comprises a reflector foil sheet that is a single sheet applied to at least two sides of the light transmitting panel with no air gaps therebetween and to a light directing side of the light transmitting panel, wherein at least one length of the light transmitting panel is partially applied with the reflector foil sheet and the at least one length of the light transmitting panel comprises a border portion defined by surface unapplied with the reflector foil sheet, wherein at least one length of the light transmitting panel is facing an interior surface of a rooftop of a motor vehicle.

12. The vehicle display of claim 11, wherein the LCD display layer is a thin-film transistor (TFT) display.

13. The vehicle display of claim 11, wherein the at least one length of the light transmitting panel further comprises a buffer wall.

14. A method of optimizing light rays for illuminating a display apparatus for use in a motor vehicle, the method comprising:

transmitting light rays, by way of a light transmitting panel, through to a viewing side of the display apparatus; and emitting light rays, by way of at least one light source, across a breadth of the light transmitting panel, wherein reflecting the emitting light rays, by way of a reflector foil sheet that is a single sheet applied to at least two sides of the light transmitting panel with no air gaps therebetween and to a light directing side of the light transmitting panel, such that the emitting light rays and reflected light rays transmit through the light transmitting panel to the viewing side of the display apparatus, wherein at least one length of the light transmitting panel is partially applied with the reflector foil sheet and the at least one length of the light transmitting panel comprises a border portion defined by surface unapplied with the reflector foil sheet.

* * * * *